United States Patent [19]
Needham et al.

[11] 3,792,686
[45] Feb. 19, 1974

[54] COW PREPARATION STALL FOR MILKING PARLORS

[75] Inventors: Lyle L. Needham, Bellwood; Harold V. Swanson, Downers Grove, both of Ill.

[73] Assignee: Babson Bros. Co., Oak Brook, Ill.

[22] Filed: June 13, 1972

[21] Appl. No.: 262,359

Related U.S. Application Data

[63] Continuation-in-part of Ser. No. 75,951, Sept. 28, 1970, abandoned.

[52] U.S. Cl. .............................. 119/14.03, 119/27
[51] Int. Cl. ............................................. A01j 05/00
[58] Field of Search ............. 119/14.03, 16, 27, 159

[56] References Cited
UNITED STATES PATENTS

| | | | |
|---|---|---|---|
| 3,246,631 | 4/1966 | Holm | 119/14.03 |
| 3,554,166 | 1/1971 | Belden | 119/159 |
| 3,223,070 | 12/1965 | Gribble et al. | 119/14.03 X |
| 3,699,922 | 10/1972 | Holm | 119/14.03 |

*Primary Examiner*—Hugh R. Chamblee
*Attorney, Agent, or Firm*—Hofgren, Wegner, Allen, Stellman & McCord

[57] ABSTRACT

Apparatus for automatically preparing a cow for milking. The apparatus includes a stall having front and rear gates for confining the cow with the front gate being openable to permit the cow to leave the stall and the rear gate being openable to permit another cow to enter the stall. Located just forwardly of the rear gate is a spray assembly which is operable to sequentially spray a cow's udder with a cleaning solution and a rinsing solution. A detector located forwardly of the stall determines when a cow has left the same to be milked for automatically closing the front gate and opening the rear gate to admit another cow. A detector within the stall senses when the other cow has entered the same to close the rear gate and actuate the spray assembly. Also included is a mechanism for dispensing feed to a feed trough in the stall so that a cow may be fed while undergoing preparation for milking.

14 Claims, 4 Drawing Figures

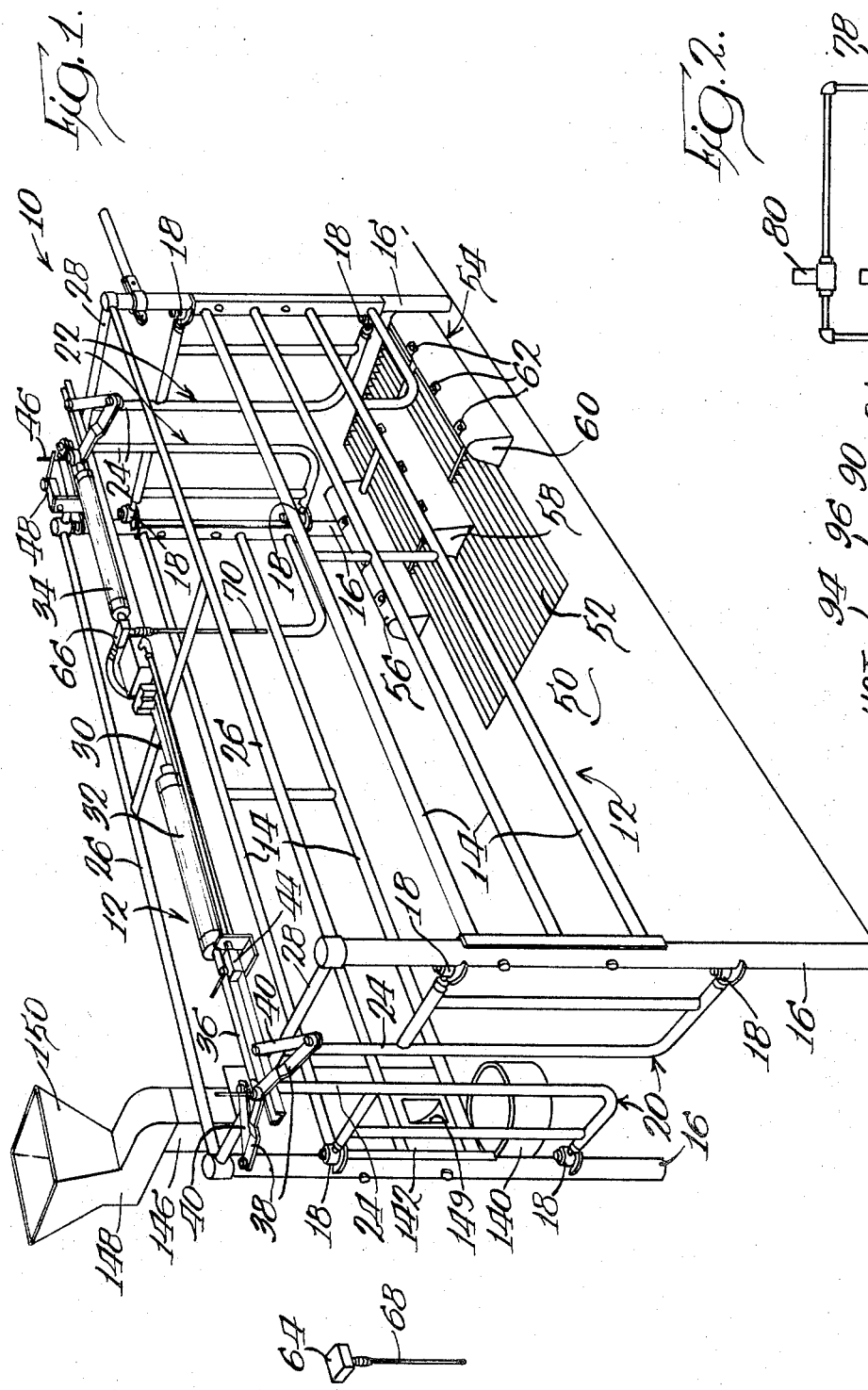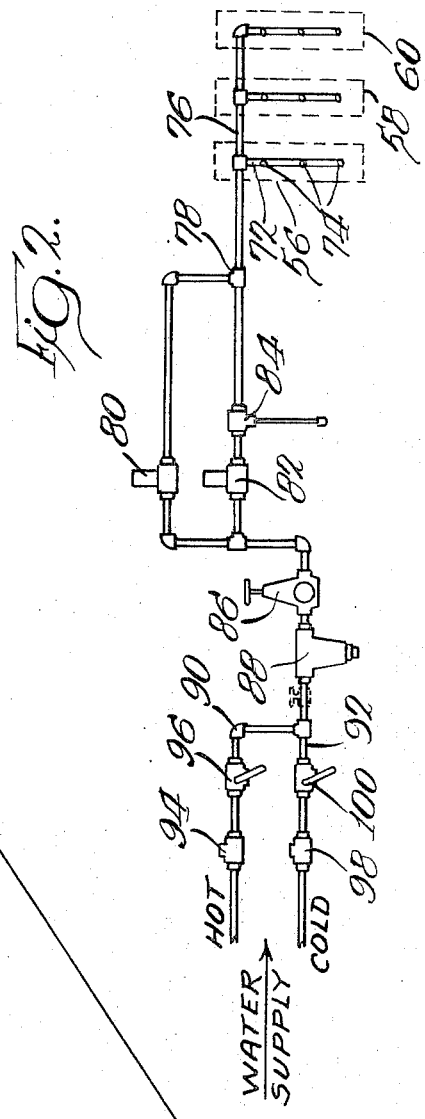

COW PREPARATION STALL FOR MILKING PARLORS

CROSS-REFERENCE

This application is a continuation-in-part of our commonly assigned application Ser. No. 75,951, filed Sept. 28, 1970 and entitled "Milking Parlor with Cow Preparation Stall", now abandoned.

BACKGROUND OF THE INVENTION

This invention relates to preparation stalls for use in milking parlors. The best prior art known to applicants includes U.S. Pat. Nos. 3,246,631 to Holm; 3,554,166 to Belden; 3,223,070 to Gribble; and 3,448,725 to Holm et al.

As is well-known, proper udder preparation is an important preliminary procedure in the process of milking cows. Normally, this has been accomplished by washing the cow's udder with warm water and thereafter rinsing the same. The washing procedure also provides an effective stimulation of the udder for so-called "milk let-down" and it has been generally desirable to allow 1 minute to elapse after the washing procedure before applying the milking unit.

Conventionally, it has been necessary to walk from stall to stall in a barn or milking parlor to wash the udders of each cow individually. After each cow's udder has been washed, it has been necessary to wait for milk let-down before attaching a milking unit. As a result, a sizable amount of time and labor has heretofore been expended in a relatively inefficient operation.

SUMMARY OF THE INVENTION

It is the principal object of the invention to provide a new and improved apparatus for automatically preparing cows for milking. More specifically, it is an object of the invention to provide an apparatus for automatically preparing cows preliminary to milking that will permit more cows to be milked per unit of time than can be accomplished with the procedures heretofore employed together with a reduction in the manual labor required.

The examplary embodiment of the invention achieves the foregoing objects through the use of a stall having elongated side walls spaced apart a distance approximately equal to the width of a cow and a length just slightly longer than the length of a cow. The front end of the stall may be closed by pivotally mounted gates while the rear end of the stall may be similarly closed. At the bottom of the stall and adjacent the rear gate is a spray assembly which is operative to direct a spray of any suitable solution towards the cow's udder. Surrounding the spray assembly is a drain to receive waste solution.

Both the front and rear gates have power operators and an associated control system. The control system includes a switch which may be thrown manually when the milking of one cow has been completed and it is desired to open the front gate to permit a prepared cow to move to a milking station. As the cow exits the front gate, a sensing device in the form of a wand switch determines that the cow has exited the stall and causes the power operator to close the front gate. When the front gate is completely closed, the control circuitry causes the rear gate to open to admit the next cow to the stall. Once the cow has been fully admitted to the stall, a detector, again in the form of a wand switch, is operative to cause the power operator for the rear gate to close the same behind the cow. Upon the closing of the rear gate, a control system for the spray assembly is operated to cause the same to first spray the cow's udder with a cleaning solution and thereafter a rinsing solution. Timing devices are employed so that the length of each part of the spray cycle may be independently regulated as desired.

The apparatus also includes means whereby a portion of the cow's feeding may be accomplished in the stall. Specifically, the front gate is formed of two gates, each mounted on an opposite side of the stall and one of the gates bears a feed trough which, when the gate is closed, will be presented to the cow but when the gate is open, is moved outside the stall so that the cow is not attracted by the food but leaves the preparation stall and proceeds to the milking area. A feeding mechanism for providing a trough with feed may be actuated when the rear gate has closed with the cow in the stall and a timing mechanism may be associated with the feeder to control the length of operation of the same and thus the amount of feed provided to the cow in the stall.

Other objects and advantages of the invention will become apparent from the following specification taken in conjunction with the accompanying drawings.

DESCRIPTION OF THE DRAWINGS

FIG. 1 is a perspective view of an apparatus for automatically preparing a cow for milking made according to the invention;

FIG. 2 is a schematic illustrating liquid flow lines associated with the spraying assembly employed and a portion of the control system;

DESCRIPTION OF THE PREFERRED EMBODIMENT

Figures 3, 4:
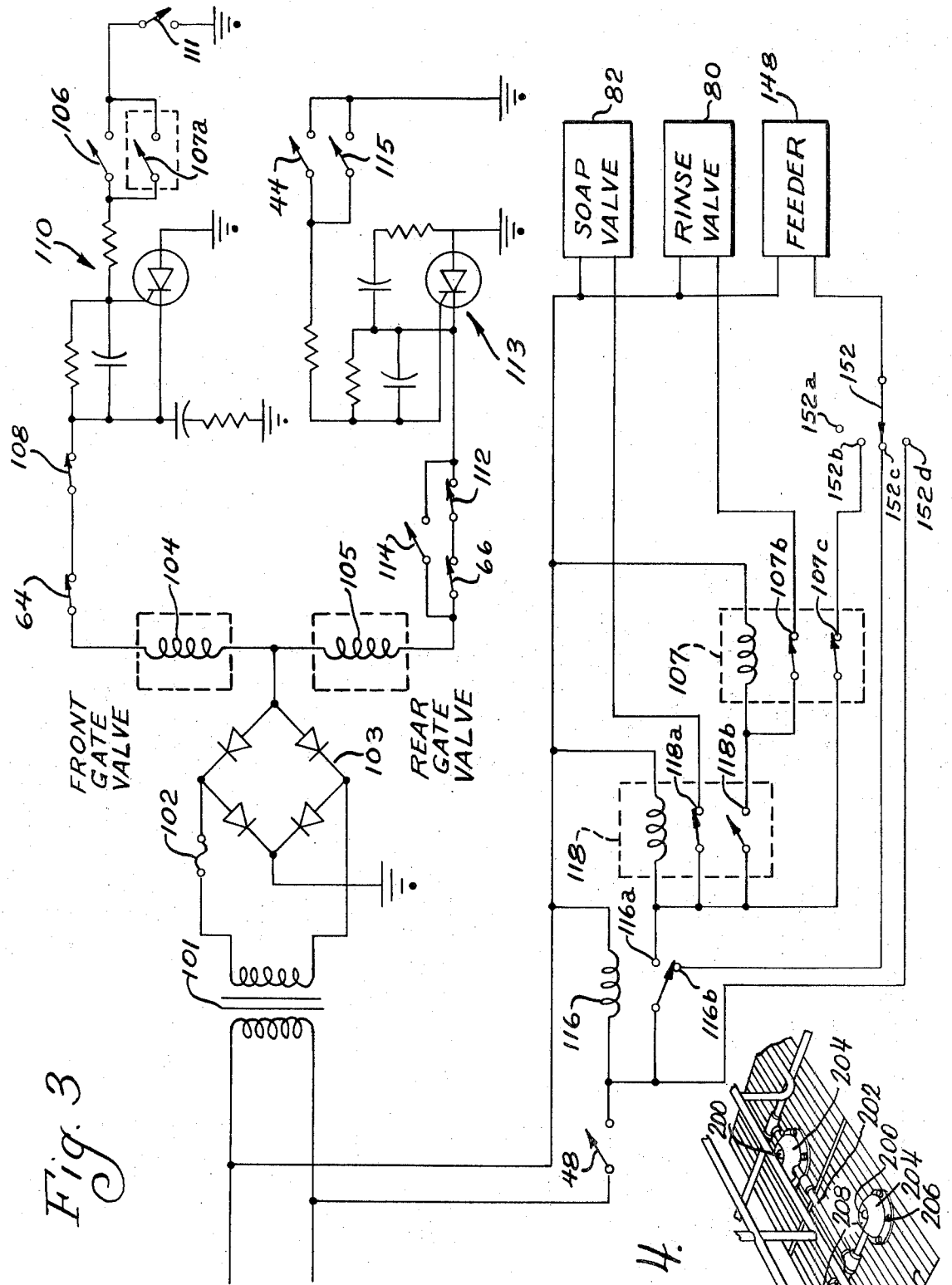
FIG. 3 is an electrical schematic illustrating the control system for the apparatus.
FIG. 4 is a fragmentary perspective view of a preferred spray head configuration.

An examplary embodiment of an apparatus for automatically preparing cows for milking is illustrated in FIG. 1 and is seen to comprise a stall, generally designated 10. The stall includes side walls, each generally designated 12, which are spaced apart a distance approximately equal to the width of a cow. Each side wall is formed of a plurality of tubes 14 which extend horizontally between upright stall posts 16 defining the corners of the stall. The length of the tubes 14 is just greater than the length of a cow so as to permit some movement of the head of the same to a feed trough as will be explained in greater detail hereinafter.

The two forwardmost stall posts 16 (as viewed in FIG. 1) each pivotally mount, as by hinges 18, a respective gate 20 which serve as a front gate means for the stall 10. Similarly, the rearwardmost stall posts 16 each pivotally mount, again by hinges 18, a respective gate 22 with the gates 22 serving as a rear gare means for the stall 10.

Each of the gates 20 and 22 is identical and each includes an upwardly extending tubular extension 24 which is connected to a gate operator as will be seen.

The stall 10 further includes an operator frame defined by horizontally extending tubes 26 which are parallel to the side walls 12 and horizontally extending tubes 28, which are parallel to the gates 20 and 22 when in the closed position and which are secured to the upper extremeties of the stall post 16 at a height sufficiently high so that a cow may enter or leave the stall 10 without encountering the tubes 28. Mounted on the top of the tubes 28 is a support beam 30 which in turn mounts a front gate power operator 32 in the form of a double acting pneumatic cylinder. The support beam 30 also mounts a rear gate power operator 34, again in the form of a double acting pneumatic cylinder.

The power operators 32 and 34 may be directed to open and close the front and rear gates respectively and since the mode of operation of the front gate power operator 32 is substantially identical to the mode of operation of the rear gate power operator 34, only the former will be described.

The cylinder defining the operator 32 includes a piston rod 36 which, at its end, is pivotally connected to one end of each of two links 38. The opposite ends of the links 38 are each pivotally connected to a respective one of two links 40. The end of each of the links opposite the pivotal connection to the links 38 is in turn connected to the upper extension 24 of a respective one of the gates 20. Preferably, the upwardly extension 24 extends above the tube 28 and the just-mentioned linkage is similarly located just above the same. As a result, the tube 28 may serve as a stop for the gates 20 in a closed position.

In the position shown in FIG. 1, the piston rod 38 is extended and, through the links 38 and 40, has caused the upper extension 24 to bear against the tube 28 to maintain the front gate in a closed position. When the operator is driven by means to be described in greater detail hereinafter so that the piston rod 36 is retracted, the links 38 and 40 will cause the gates 20 to open inwardly and abut the side walls 12 of the stall 10.

In the case of the gates 22, the piston rod of the power operator 34 is retracted to cause the gates to close in the manner illustrated in FIG. 1 and when extended, will cause the gates 22 to move outwardly to a position approximately parallel to the side walls 12 to open the stall 10.

The pivotal connection of the piston rod 36 of the power operator 32 to the links 38 also includes an upwardly extending switch actuator 42 which is operative to trip a switch 44 mounted adjacent one end of the power operator 32 when the gates 20 are moved to an open position. Similarly, the piston rod of the power operator 34 is provided with a switch actuating element 46 which is operative to trip a switch 48 when the rear gates 22 are in a closed position.

The stall 10 includes a bottom, generally designated 50, which may be formed of any suitable surface such as concrete for ease of maintenance and, adjacent the rear gates 22, includes a drainage grate 52 which may cover a suitable liquid drain (not shown). Also adjacent the gates 22 at a rearward location in the stall 10 and mounted on the bottom 50 is a spraying assembly, generally designated 54. The spray assembly 54 includes three sets of spray nozzles (not shown in FIG. 1) each covered by a respective spray cover 56, 58 and 60. Each of the spray covers includes a plurality of openings 62 in its upper surface through which a spray may be ejected by spray nozzles therewithin upwardly and toward the rear center of the stall 10.

The arrangement is such that when a cow occupies the stall, and the spray nozzles are activated, the spray will be directed towards the udder of the cow to impinge upon the same.

The system also includes a pair of cow detecting means in the form of wand switches 64 and 66 respectively. The wand switch 64 is located forwardly of the front gate 20 and, when a cow leaves the stall, a depending wand or switch actuator 68 will be struck by the cow to trip the switch 64. The switch 66 is mounted over the spproximate center of the stall and includes a wand or actuator 70 which will ben engaged by a cow upon entering the stall to trip the switch 66. The purpose of the switches will be described in greater detail hereinafter.

Turning now to FIG. 2, the nautre of the spray assembly 54 and an associated source of cleaning and rinsing liquid to be impinged upon a cow's udder together with control elements therefor will be described. The outline of the spray covers 56, 58 and 60 is shown in dotted lines and illustrates the cooperation of the same with respective conduits 72. Each conduit 72 includes three spray nozzles 74 which are in line with the openings 62 in the respective cover. Normally, the spray nozzles 74 associated with the centermost conduit 72 will be directed vertically upwardly while the spray nozzles 74 associated with the leftmost and rightmost conduits 72 will be directed upwardly and toward a vertical plane extending through the center conduit 72 at an angle deviating from the vertical in the range of 10°–20°. This arrangement insures that the udder of a cow within the stall will be completely blanketed by the spray emanating from the nine nozzles during the cleaning and rinsing cycles.

The conduits 72 are interconnected by a conduit 76 which in turn leads to a tee 78 connected to both a rinse water valve 80 and a cleaning solution valve 82. In the case of the cleaning solution valve 82, an injector 84 of conventional construction may be interposed between the valve 82 and the tee 78 so that a liquid passing through the valve 82 will have a cleaning solution added thereto by the ejector 84.

The valves 80 and 82 are also connected to a pressure regulator 86 which is connected via a conventional strainer 88 to both a hot water line 90 and a cold water line 92. The hot water line includes a check valve 94 and a control valve 96 while the cold water line includes similar valves 98 and 100.

Through the foregoing construction, by selective operation of the control valves 96 and 100, the temperature of water ultimately directed to the spray nozzles 74 may be controlled while the regulator 86 may be used to set the pressure of the water applied to the nozzles 74. It will be appreciated also that whether water alone is applied to the nozzles 74 or whether water together with a cleaning solution is applied to the nozzles 74 will depend upon which of the valves 80 and 82 is opened. Specifically, when the valve 80 is open, water alone for rinsing purposes will be directed to the nozzles 74 while when the valve 82 is open and assuming the injector 84 is being utilized, a cleaning solution will be directed to the nozzle 74 to be sprayed upon the cow's udder. As will be seen, normally the valve 82 is open to spray the cow's udder with a cleaning solution for a predetermined time and thereafter, the valve 80 is opened to rinse the cow's udder for a predetermined time.

The means by which the front and rear gate power operators 32 and 34 as well as the valve 80 and 82 are controlled can best be understood from FIG. 3 which illustrates one form of an electrical control circuit for the same. Specifically, power is applied through the primary of a transformer 101 and the secondary thereof is connected through a fuse 102 to a full wave rectifier 103. One side of the full wave rectifier 103 is connected to ground while the other is connected to the winding of an air valve 104 for controlling the front gate operator 32 and to the winding of a similar valve 105 for controlling the rear gate operator 34. The arrangement is such that when either of the windings 104 and 105 is energized, the associated air valve will cause the associated power operator 32 or 34 to open the respective gates. However, when either of the windings 104 or 105 is de-energized, the associated valve will cause the corresponding operator 32 or 34 to close the associated gate.

Turning first to the front gate control valve 104, the same is in series with normally closed contacts of the switch 64; a normally closed switch 108; and a silicon controlled rectifier circuit, generally designated 110, across the full wave rectifier 103. The gate of the silicon controlled rectifier circuit 110 is returned to ground through a normally open switch 111 in series with the parallel combination of normally open contact 106 of a manually operable switch and normally open contacts 107a of a relay 107.

The rear gate coil 105 is connected in series with normally closed contacts of the switch 66, normally closed contacts of a manually operable switch 112 and returned to ground through a silicon controlled rectifier circuit, generally designated 113. In addition, a circuit is established in parallel with the switches 66 and 112 and includes a normally open, manually operable switch 114.

The silicon controlled rectifier circuit also has its gate connected to ground through the parallel combination of normally open contacts of the switch 44 and normally open contacts of manually operated switch 115.

In general, the operation of the circuit is as follows. Let us assume that a cow is in the stall 10 and that the front gate 20 and the rear gare 22 are both closed. According to the foregoing relation of the valve coils 104 and 105 to the position of the gates, both valve coils will be de-energized as, at this time, neither of the silicon controlled rectifier circuits 110 and 113 will be conducting. When the milker is ready for the cow in the stall after the same has been prepared, he will manually close the switch 111 which will trigger the silicon controlled rectifier of the circuit 110 and cause the same to conduct assuming one of the switches 106 or 107a to be closed, since, at this time, the switches 64 and 108 will be closed. The valve coil 104 then will be energized to cause the power operator 32 to open the front gates 20.

As the cow emerges, the cow will trip the wand 68 of the switch 64 thereby momentarily opening the switch 64 breaking the primary path of conduction through the silicon controlled rectifier in the circuit 110 which will thereby cease to conduct. Since the switch 111 will only have been closed momentarily, the silicon controlled rectifier will not be retriggered and the valve coil 104 will be de-energized. This will result in the operator 32 closing the front gates 20.

The resultant movement of the front gates 20 from the open position to the closed position will result in the switch actuator 42 momentarily tripping the switch 44 which will then trigger the silicon controlled rectifier circuit 120. Since the switches 66 and 112 are in a normally closed condition, the valve coil 105 will be energized to cause the power operator 34 to open the rear gates 22. The next cow in line will then walk into the stall 10 and in the process, strike the wand 70 to trip the switch 66 which will open to thereby break the circuit to the valve coil 105. As a result, the power operator will then close the gates 22.

After a cow has entered the stall 10 and been confined therein by the closing of both the gates 20 and 22, the preparation cycle is initiated in the following manner. Specifically, normally open contacts of the switch 48 are in series with a source of power and a control circuit for the valves 80 and 82. When the rear gates 22 have moved to a closed position following the tripping of the switch 66 by a cow entering the stall, the switch actuator 46 will close the switch 48 which then applies power to the coil 116 of a conventional, adjustable time delay relay 116. The time delay relay 116 includes normally open contacts 116a and normally closed contacts 116b. As is well known, after a preset time has expired, the normally closed contacts 116b will open, while the normally open contacts 116a will close. When the time has expired, power is supplied to the remainder of the control circuit.

The purpose of the relay 116 is to provide an adjustable pre-preparation delay. In particular, the longer the period that elapses between the washing and rinsing of the cow's udder and the resultant milk letdown and the time of milking, the less effective the letdown will be. Thus, in order to maximize production, it is necessary that milking follow, as soon as possible, the washing and rinsing operation responsible for the letdown.

It will be also recognized, that in a very real sense, each herd will have its own traffic patterns and characterisitics which are different of those of other herds. Thus, the relay 116 allows a delay in the preparation cycle responsible for letdown that can be varied according to the characteristic of a particular herd or even animals within the herd so that the preparation cycle will be completed at just about the time that the milking of the prior cow has been completed as opposed to being completed say, for example, three or four minutes prior to the completion of the milking of the prior cow.

After the preset pre-preparation delay time has expired and normally open contacts 116a have closed, power will be applied to the coil of a second adjustable time delay relay 118 which may be set to control the length of the wash portion of the preparation cycle. The relay 118 includes normally closed contacts 118a and normally open contacts 118b. The former are connected to the soap valve 82 so that immediately upon application of power to the coil 118, the soap valve 82 will be energized and open to initiate the washing operation. After a preset time on the time delay relay 118 has expired, the normally closed contacts 118a will open to terminate the washing operation while the contacts 118b will close to apply power to the coil of the relay 107 which again is an adjustable time delay relay. In addition to the normally open contacts 107a mentioned previously, the time delay relay 107 includes a first set of normally closed contacts 107b and a second set of normally closed contacts 107c. The time delay relay 107 controls the rinse cycle and may be adjusted to control the length of the rinse cycle. It will be appreciated from the above described circuitry that as soon as the washing operation has been completed, power will be applied to the rinse valve 80 to open the same immediately upon termination of the washing cycle by reason of power being applied to the rinse valve 82 through the contacts 107b.

After the predetermined time set on relay 107, the contacts 107a will close while the contacts 107b and 107c will open. The opening of the contacts 107b will terminate the rinsing operation. The closing of the contacts 107a will then condition the front gate valve control circuit for operation. More particularly, since the switch 106 is normally open and the contacts 107a are normally open, it will be appreciated that the energization circuits for the front gate valve coil 104 will be broken until the rinse cycle is completed. Thus, the front gate cannot inadvertently be opened until the preparation cycle has been completed. Should, for any reason, it be desired to intentionally open the front gate valve before the completion of the cycle, the switch 106 may be closed to override the interlock provided by the contacts 107a in the front gate valve control circuit.

The purpose of the switches 108, 112, 114 and 115 is to control the system manually if desired. For example, the front gates 20 can be closed and precluded from opening by opening the switch 108. By the same token, the rear gates can be closed and precluded from opening by opening the switch 112, opened and precluded from closing by closing the switch 114 or manually closed by closing the switch 115.

To further enhance the efficiency of a dairy operation, an automatic feeder may be employed in conjunction with the stall 10. Returning to FIG. 1, a feed bowl 140 is mounted at the leftmost front gate 20 (as viewed in FIG. 1) at a height thereon such that the top of the bowl 140 may pass below the lowermost tube 14 when the gate 20 opens inwardly. Mounted on the tube 14 just above the position of the feed bowl 140 is a plate 142 having a feed opening 144 therein. The feed opening 144 is in communication with a chute 146 extending to a feeder 148 having a feed hopper 150. The feeder 148 includes a motor (not shown) for dispensing feed contained in the hopper 150 at a predetermined rate to the chute 146 by which it will be directed through the opening 144 to the feed bowl. Thus, a cow within the stall 10 may reach feed contained in the feed bowl 140 so long as the front gates 20 are in a closed position. However, when the gates 20 open, the feed bowl 140 is moved beneath the lowermost tube 14 to a location outside the stall 10 to preclude the cow from feeding further, whereupon the cow may exit the stall 10.

FIG. 3 also illustrates means for controlling the feeder 148. In particular, a manually operable switch 152 having four sets of contacts 152a, 152b, 152c and 152d is provided. The switch 152 is of the conventional type wherein the blade thereof can be located on any one of the contacts at any given time. As can be seen, the same is in series with the feeder 148 and is operative to apply power thereto to cause the feeding of feed or to prevent the feeding of feed, as may be desired, as follows.

The contact 152a of the switch 152 is disconnected. As a result, the location of the switch 152 on that counter will result in total disablement of the feeder 148 if that is desired. The contact 152b is returned to power through the contacts 107c of the relay 107, the normally open contact 116a of the relay 116 and the switch 48. Thus, the closing of the switch 152 through the contact 152b will energize the feeder for a length of time corresponding to that for the total preparation cycle, namely, the sum of the times set on the relay 118 and the relay 107. The feeder will not be energized, however, until the preparation cycle delay has taken place and the normally open contacts 116a have closed.

The contact 152c is connected through the normally closed contact 116b of the relay 116 and the switch 48 to power. Thus, when the switch 152 is closed through the contact 152c, the feeder will be energized only for the period set on the pre-preparation cycle delay relay 116 inasmuch as the circuit will be broken by the opening of contacts 116b on the completion of the pre-preparation delay.

The contacts 152d are connected to power only through the switch 48. As a result, if the switch 152 is closed through the contacts 152d, the feeder 148 will be energized for the entire time period that a cow is in the stall.

FIG. 4 illustrates a preferred form of spray head configuration that may be used in lieu of the spraying assembly 54. More particularly, the spraying assembly of FIG. 4 comprises three spray nozzles 200 arranged in a triangular configuration. The apex of the triangle is adjacent the rear gates 22 while the base of the triangle is located forwardly thereof. All nozzles 200 are located above the grate 52 and are interconnected by a conduit 202 which may be connected to the plumbing system illustrated in FIG. 2 at the tee 78.

Each of the nozzles 200 is protected by a dome-shaped cover 204 secured by any suitable means as bolts 206 to the grate 52. Each cover includes a central, upper opening 208 vertically aligned with the spray nozzles 200, allowing the washing or rinsing liquid, as the case may be, to be directed upwardly to the cow's udder.

As a result of the foregoing, it will be seen that a user of a stall made according to the invention is provided with a variety of options for feeding periods of cows within the prep stall. The system is particularly efficient in that it provides such a variety without the need for a separate timing device, although one could be used in lieu thereof if desired. Generally, however, such has not been found necessary in that the variety of settings on the different time delay relays 116, 118 and 107 and the ability to select between combinations of the periods set thereon will encompass most situations without the expense that would be necessitated by the presence of still another timing device.

From the foregoing, it will be seen that the invention provides automated means for preparing a cow for milking and further takes advantage of the time spent in preparing the cow to feed the same. It will also be appreciated that the invention eliminates much of the walking from stall to stall heretofore required in preparing cows as well as time spent waiting for milk letdown prior to milking a given cow inasmuch as milk letdown can occur while a given cow is in the stall 10 while the preceding cow is being milked. It will also be recognized that the system permits the user to easily vary time periods according to traffic patterns of the cows in a herd so as to maximize production by minimizing the time between the milk letdown and the actual milking process.

It will also be appreciated that the manually operable switches 108, 112, 114 and 115, and particularly switches 114 and 115, provide valuable override functions that allow manual control of the traffic passing through the stall. The override control provided by the switches 114 and 115 is particularly important inasmuch as the same control the rear gates 22 and thus provide a substantial measure of flexibility in regulating traffic insofar as admission to the stall can easily be manually controlled.

It will also be recognized that the electrical system, with minor modifications or additions, lends itself to automatic control of auxiliary functions that may be required in particular installations. For example, in some installations it may be necessary to provide an auxiliary water pump to insure that there is an adequate supply of wash and rinse water at proper pressure during the preparation cycle. Thus, such a pump could be added to the system and controlled in the same general manner as the feeder 148.

1. Apparatus for automatically preparing a cow for milking comprising:
   a. means defining a stall having sides spaced apart a distance equal to about the width of a cow and having a length slightly longer than the length of a cow, a front gate openable to permit a cow to leave the stall, and a rear gate openable to permit a cow to enter the stall;
   b. spray means located at the bottom of the stall and adjacent said reargate for directing a liquid towards the udder of a cow within the stall;
   c. means associated with said spray means for controlling the same first to direct a cleaning solution and thereafter a rinsing solution toward a cow's udder whereby the cow's udder is washed and rinsed prior to milking;
   d. means for detecting when a cow leaves the stall and for closing the front gate means thereof;
   e. means responsive to the closing of said front gate for opening the rear gate to permit another cow to enter the stall; and
   f. means for detecting when a cow has entered said stall and for closing said rear gate and initiating operation of said spray means.

2. Apparatus according to claim 1 wherein said controlling means includes timing means for controlling the length of time that said spray means sprays a cleaning solution on a cow's udder and the time that said spray means sprays a rinsing solution on a cow's udder.

3. Apparatus according to claim 1 wherein said last-named detecting means includes adjustable timing means settable to provide a predetermined time delay between the closing of said rear gate and the initiation of operation of said spray means.

4. Apparatus according to claim 3 wherein said controlling means includes second timing means for controlling the length of time that said spray means sprays a cleaning solution on a cow's udder and the time that said spray means sprays a rinsing solution on a cow's udder; a feed trough in said stall; means for filling said feed trough; and feed timing means for controlling the period of operation of said filling means, said feed timing means comprising said first and second timing means.

5. Apparatus according to claim 1 further including means responsive of said spray means for precluding inadvertent opening of said front gate during operation of said spray means.

6. Apparatus for automatically preparing a cow for milking comprising:
   a. means defining a stall having sides spaced apart a distance equal to about the width of a cow and having a length slightly longer than the length of a cow, a front gate openable to permit a cow to leave the stall, and a rear gate openable to permit a cow to enter the stall;
   b. spray means located at the bottom of the stall and adjacent said rear gates for directing a liquid towards the udder of a cow within the stall;
   c. means associated with said spray means for controlling the same first to direct a cleaning solution and thereafter a rinsing solution toward a cow's udder whereby the cow's udder is washed and rinsed prior to milking;
   d. means for detecting when a cow leaves the stall and for closing the front gate means thereof and for opening the rear gate thereof to permit another cow to enter the stall;
   e. means for detecting when a cow has entered said stall and for closing said rear gate and initiating operation of said spray means;
   f. means responsive to said spray means for precluding inadvertent opening of said front gate during operation of said spray means.

7. Apparatus for automatically preparing a cow for milking comprising:
   a. a stall having side walls spaced a sufficient distance to accommodate a cow, a pivotally mounted front gate for closing the front of the stall, and a pivotally mounted rear gate for closing the rear of the stall;
   b. a plurality of spray nozzles at the bottom of the stall and located toward the rear thereof and positioned to direct a liquid towards the udder of a cow within the stall;
   c. a source of cleaning liquid;
   d. a source of rinsing liquid;
   e. first power operated means for opening and closing said front gate;
   f. second power operated means for opening and closing said rear gate;
   g. manually operable control means for causing said first power operated means to open the same to permit a cow to leave the stall;
   h. cow detecting means for detecting when a cow has left the stall and for causing said first power operated means to close the front gate;
   i. means responsive to the closing of the front gate for causing said second power operated means to open the rear gate to permit a cow to enter the stall;
   j. second cow detecting means for detecting when a cow has entered the stall for causing said second power operated means to close the rear gate;
   k. means responsive to the closing of said rear gate for establishing fluid communication between said source of cleaning solution and said nozzles whereby the udder of the cow in the stall will be cleaned; and
   l. means responsive to the termination of operation of said last-named means for establishing fluid communication between said source of rinsing solution and said nozzles whereby rinsing solution will be directed at the udder of a cow within the stall to rinse the same following cleaning thereof.

8. Apparatus for automatically preparing a cow for milking comprising: means defining a stall having sides spaced apart a distance equal to about the width of a cow and having a length slightly longer than the length of a cow; and a front gate openable to permit a cow to leave the stall; spray means located at the bottom of the stall and adjacent the rear thereof for directing a liquid towards the udder of a cow within the stall; means for detecting when a cow leaves the stall and for closing the front gate means thereof; means for detecting when a cow has entered said stall and for initiating operation of said spray means; a feed trough in said stall, said front gate being associated with said feed trough so that a cow in the stall is being precluded from feeding from said trough when said front gate is open; and means for supplying a predetermined amount of feed to said trough, said means for initiating operation of said spray means further being operative to initiate operation of said feeding means.

9. Apparatus for automatically preparing a cow for milking comprising:
   a. means for defining a stall having sides spaced apart a distance equal to about the width of a cow and having a length slightly longer than the length of a cow, a front gate openable to permit a cow to leave the stall, and a rear gate openable to permit a cow to enter the stall;
   b. spray means located at the bottom of the stall and adjacent said rear gate for directing a liquid towards the udder of a cow within the stall;
   c. means associated with said spray means for controlling the same first to direct a cleaning solution and thereafter a rinsing solution toward a cow's udder whereby the cow's udder is washed and rinsed prior to milking;
   d. means for detecting when a cow leaves the stall and for closing the front gate means thereof and for opening the rear gate thereof to permit another cow to enter the stall;
   e. means for detecting when a cow has entered said stall and for closing said rear gate and initiating operation of said spray means;
   f. a feed trough in said stall; and
   g. means for filling said feed trough in response to the closing of said rear gate means.

10. Apparatus according to claim 9 further including timing means for controlling the period of operation of said filling means to regulate the amount of feed fed into said trough.

11. Apparatus according to claim 9 wherein said front gate opens inwardly into said stall and is operative, when open, to preclude a cow in the stall from feeding from said feed trough.

12. Apparatus according to claim 11 wherein said feed trough is mounted on said front gate and moves therewith to a position outside the stall when said front gate is open and to a position cooperating with said feeding means and within the stall when said front gate is closed.

13. Apparatus according to claim 9 wherein said last-named detecting means includes a first adjustable timing means for providing a predetermined time delay between the closing of said rear gate and initiation of operation of said spray means; and wherein said controlling means includes a second adjustable timing means for setting the period of operation of said spray means, and said filling means is selectively responsive to either of said first and second timing means whereby the period of operation of said filling means may be controlled.

14. Apparatus for automatically preparing a cow for milking comprising:
   a. means defining a stall having sides spaced apart a distance equal to about the width of a cow and having a length slightly longer than the length of a cow, a front gate openable to permit a cow to leave the stall, and a rear gate openable to permit a cow to enter the stall;
   b. spray means located at the bottom of the stall and adjacent said rear gates for directing a liquid towards the udder of a cow within the stall;
   c. means for detecting when a cow leaves the stall and for closing the front gate means thereof and for opening the rear gate thereof to permit another cow to enter the stall; and
   d. means for detecting when a cow has entered said stall and for closing said rear gate and initiating operation of said spray means and including adjustable timing means settable to provide a predetermined time delay between the closing of said rear gate and the initiation of operation of said spray means.

* * * * *